DONALD W. HESELTINE
LEWIS L. LINCOLN
INVENTORS

United States Patent Office 3,423,207
Patented Jan. 21, 1969

3,423,207
SOLUBILIZED STYRYL DYES
Donald W. Heseltine and Lewis L. Lincoln, Rochester, N.Y., assignors to Eastman Kodak Company, Rochester, N.Y., a corporation of New Jersey
Filed Sept. 1, 1964, Ser. No. 393,576
U.S. Cl. 96—84    8 Claims
Int. Cl. G03c 1/24

ABSTRACT OF THE DISCLOSURE

Solubilized styryl dyes having a sulfo group attached directly to a nuclear carbon atom of a 5- or 6-membered heterocyclic nucleus are useful, for example, in photography as light-filtering and antihalation dyes. They can be prepared by condensing nuclear sulfonated cyclammonium quaternary salts with certain aromatic aldehydes. Anhydro - 2 - p - dimethylaminostyryl-3-ethyl-4-p-sulfophenylthiazolium hydroxide, for example, can be prepared by condensing 3-ethyl-2-methyl-4-p-sulfophenyl thiazolium p-toluene sulfonate with p-dimethylaminobenzaldehyde. The styryl dye compounds have good solubility in water, good stability to solutions of bases and acids, excellent mordant properties and are readily bleachable. They are especially useful in filter layers and in antihalation layers in photographic elements.

---

Figure 1:
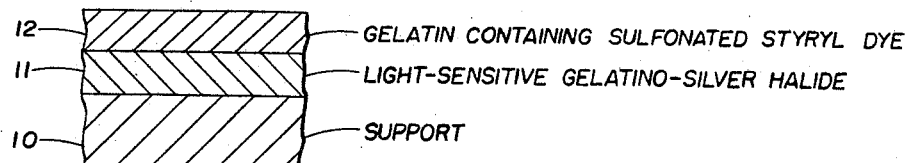

This invention relates to a new class of solubilized styryl dyes, and more particularly to bleachable styryl dyes obtained by condensing nuclear sulfonated cyclammonium quaternary salts with certain aromatic aldehydes, and to photographic elements containing these dyes as light-filtering and antihalation dyes.

Styryl dyes are known to be useful in the photographic art. For example, they have been used as light-filtering dyes, antihalation dyes, etc., in photographic elements. However, they have been seriously limited in their photographic applications because of relatively poor solubility. Also, the styryl dyes available heretofore are not readily mordanted.

We have now found that readily bleachable styryl dyes that are characterized by both good solubility and stability and, in addition, excellent mordanting ability, may be prepared from certain nuclear sulfonated cyclammonium quaternary salts and certain aromatic aldehydes.

It is, accordingly, an object of the invention to provide a new class of styryl dyes that are characterized by improved water solubility, good stability to solutions of strong bases and acids, and excellent mordanting properties, and that are especially useful in filter layers and in antihalation layers in photographic elements. Another object is to provide a process for the preparation of this new class of styryl dyes. Other objects will become apparent from the description and examples.

The new styryl dyes of the invention include those represented by the following formulas:

(I) 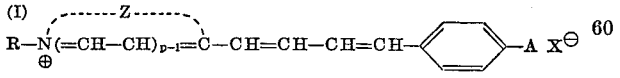

and (II) 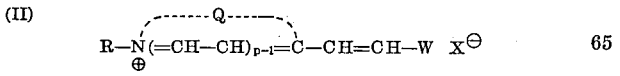

wherein p represents an integer of from 1 to 2; R represents an alkyl group of from 1 to 18 carbon atoms, e.g., methyl, ethyl, propyl, γ-sulfopropyl, isopropyl, butyl, sec.-butyl, γ-sulfobutyl, dodecyl, octadecyl, β-hydroxyethyl, γ-hydroxypropyl, β-methoxyethyl, β-ethoxyethyl, allyl, benzyl, β-phenylethyl, carboxymethyl, β-carboxyethyl, γ-carboxypropyl, β-acetoxyethyl, γ-acetoxypropyl, carboxymethoxymethyl, carboethoxyethyl, etc. groups; A represents the hydroxyl group, an alkoxy group, e.g. methoxy, butoxy, decyloxy, octadecyloxy, etc., and a —NR$_1$R$_2$ group wherein R$_1$ and R$_2$ each represents the same or different alkyl group of from 1–12 carbon atoms, e.g., methyl, ethyl, 2-cyanoethyl, propyl, isopropyl, sec.-butyl, hexyl, octyl, decyl, etc. groups; and Z represents the non-metallic atoms required to complete a five to six membered heterocyclic nucleus containing at least one sulfo group attached directly to a nuclear carbon atom, said heterocyclic nucleus being selected from those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 4-phenylbenzothiazole, 5-phenylbenzothiazole, 4-methyloxazole, 5-methyloxazole, 4-phenyloxazole, 4,5-methoxybenzothiazole, 5-iodobenzothiazole, 6-iodobenzothiazole, 4-ethoxybenzothiazole, 5-ethoxybenzothiazole, tetrahydrobenzothiazole, 5,6 - dimethoxybenzothiazole, 5,6 - dioxymethylenebenzothiazole, 5 - hydroxybenzothiazole, 6-hydroxybenzothiazole, etc.), those of the naphthothiazole series (e.g., α-naphthothiazole, β,β-naphthothiazole, 5 - methoxy-β-naphthothiazole, 5 - ethoxy-β-naphthothiazole, 8-methoxy-α-naphthothiazole, 7-methoxy-α-naphthothiazole, etc.), those of the thianaphtheno-7′,6′,4,5-thiazole series (e.g., a 4′-methoxythianaphtheno-7′,6′,4,5-thiazole, etc.), those of the oxazole series (e.g., 4-methyloxazole, 5-methyloxazole, 5-phenyloxazole, 4,5-diphenyloxazole, 4-ethyloxazole, 4,5-dimethyl-oxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-series (e.g., benzoselenazole, 5-chlorobenzoselenazole, 5-methoxybenzoselenazole, 5-hydroxybenzoselenazole, tetrabenzoxazole, etc.), those of the naphthoxazole series (e.g., α-naphthoxazole, β- and β,β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β,β- and β-naphthoselenazole, etc.), those of the thiazoline series (e.g., thiazoline 4-methylthiazoline, etc.), those of the 2-quinoline series (e.g., 2-quinoline, 3-methyl - 2 - quinoline, 5-methyl-2-quinoline, 7-methyl - 2 - quinoline, 8-methyl-2-quinoline, 6-chloro - 2 - quinoline 8-chloro - 2 - quinoline, 6-methoxy - 2 - quinoline, 6-ethoxy - 2 - quinoline, 6-hydroxy-2-quinoline, 8-hydroxy-2-quinoline, etc.), those of the 4-quinoline series (e.g., 4-quinoline, 6-methoxy-4-quinoline, 7-methyl-4-quinoline, 8-methylquinoline, etc.), those of the 1-isoquinoline series (e.g., 1-isoquinoline, 3,4-dihydro-1-isoquinoline, etc.), those of the 3-isoquinoline series (e.g., 3-isoquinoline, etc.), the 2-pyridine series (e.g., 2-pyridine, 3-methyl-2-pyridine, 4-methyl-2-pyridine, 5-methyl-2-pyridine, 3,4-dimethyl-2-pyridine, 4-chloro-2-pyridine, 3-hydroxypyridine, 3-phenyl-2-pyridine, etc.), those of the 4-pyridine series (e.g., 2-methyl-4-pyridine, 3-methyl-4-pyridine, 3-chloro-4-pyridine, 2,6-dimethyl-4-pyridine, 3-hydroxy-4-pyridine, etc.), those of the 1-alkylimidazole series (e.g., 1-methylimidazole, 1-ethyl-4-phenylimidazole, 1-butyl-4,5-dimethylimidazole, etc.), those of the 1-alkylbenzimidazole series (e.g., 1-methylbenzimidazole, 1-butyl-4-methylbenzimidazole, 1-ethyl-5,6-dichlorobenzimidazole, etc.), and those of the 1-alkylnaphthimidazole series (e.g., 1-ethyl-α-naphthimidazole, 1-methyl-β-naphthimidazole, β,β-naphthimidazole, etc.); Q represents the nonmetallic atoms required to complete the heterocyclic nucleus defined for Z and in addition heterocyclic nuclei of the 3,3-dialkylindolenine series (e.g., 3,3-dimethylindolenine, 3,3,5-trimethylindolenine, 3,3,7-trimethylindolenine, etc.); W represents a

group or a

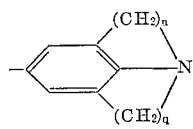

group in which A is as defined previously; $n$ represents an integar of from 2 to 3; q represents an integer of from 2 to 3; and $X^{\ominus}$ represnts an acid anion (e.g., chloride, bromide, iodide, thiocyanate, sulfamate, methyl sulfate, ethyl sulfate, perchlorate, p-toluenesulfonate, etc.).

In accordance with the invention, we prepare our new styryl dyes represented by the above Formulas I and II by condensing an aromatic aldehyde represented by the following general formulas:

(III)

and (IV)

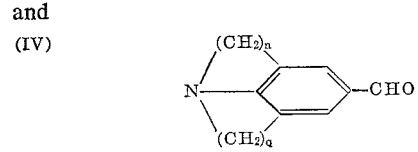

wherein $n$, $q$ and A are as previously defined, and $m$ is an integar of from 1 to 2, with a nuclear sulfonated cyclammonium quaternary salt represented by the general formula:

(V)

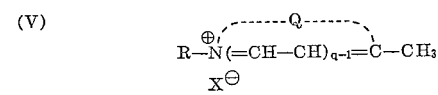

wherein R, $p$, $X^{\ominus}$ and Q are as previously defined.

The proportions of the reactants can very from about 1–3 moles of the aldehyde to each mole of the cyclammonium quaternary salt. Advantageously, the reaction is carried out at a temperature of from about 50–120° C. in the presence, if desired, of a condensation agent, such as, a tertiary amine, e.g., piperidine, triethylamine, tripropylamine and the like. An inert solvent, such as, ethyl alcohol, propyl alcohol, isopropyl alcohol, butyl alcohol or isobutyl alcohol can be employed with advantage as the reaction medium. The styryl dye obtained can then be separated and purified by conventional methods, for example, by chilling the alcoholic reaction mixture to precipitate the crude dye, filtering, washing and recrystallization from methanol or other suitable solvent.

The sulfonated cyclammonium quaternary salts are prepared from bases containing both a reactive methyl group and a sulfonic acid group attached to nuclear carbon atoms. These bases may be prepared either by direct sulfonation of appropriate intermediates with sulfuric acid and oleum or by synthesis from certain sulfonated 2-aminophenols, and acetic anhydride. The direct sulfonation method is preferred and is illustrated as follows:

(VI)

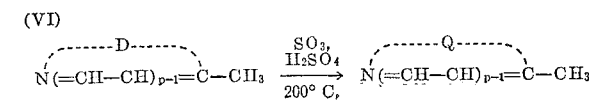

wherein Q and $p$ are as previously defined, and D is identical to Q except that no sulfo group substituent is contained therein. The quaternary salts represented by above Formula I are obtained by treating the above product with a quaternizing agent RX, wherein R and X are as previously defined. Typical quaternizing agents include alkyl halides, such as, methyl iodide, ethyl iodide, butyl iodide, etc., and corresponding bromides and chlorides, dialkyl sulfates such as dimethyl sulfate, diethyl sulfate, etc., alkyl arylsulfonates, such as, methyl p-toluenesulfonate, butyl p-toluenesulfonate, etc., alkanesultones containing at least three carbon atoms such as 1,4-butanesultone, 2,4-butanesultone, 3-propanesultone, hexylsultone, isohexylsultone, etc., and lactones such as propiolactone, γ-butyrolactone, γ-valerolactone, 2-valerolactone, etc.

The following examples further illustrate the new styryl dyes of the invention and the manner of their preparation.

EXAMPLE 1

Anhydro-2-p-dimethylaminostyryl-3-ethyl-4-p-sulfophenylthiazolium hydroxide

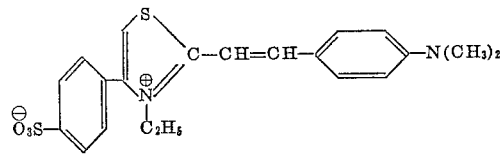

2-methyl-4-p-sulfophenylthiazole (2.5 g., 1 mol.) and ethyl p-toluenesulfonate (15 g., 7.5 mol.) were heated over an open flame until the reaction mixture became homogeneous and began to darken. After cooling to room temperature the reaction mixture was washed with three 50 ml. portions of ethyl ether.

To the residue containing 3-ethyl-2-methyl-4-p-sulfophenylthiazolium p-toluene sulfonate was added p-dimethylaminobenzaldehyde (2.0 g., 1.3 mol.), piperidine (2.5 ml., 2.5 mol.) and ethyl alcohol (50 ml.). The reaction mixture was heated under reflux for two hours. A further portion of piperidine (1.5 ml., 1.5 mol.) was added and heating continued for thirty minutes. The reaction mixture was chilled, filtered and the crude dye (32%) dried. One recrystallization from cresol and methanol gave 0.85 g. (20%) of pure dye; melting point 283–285.5° C. dec.

EXAMPLE 2

Anhydro-2-p-dimethylaminostyryl-1-methyl-5-sulfonaphth[1,2-d]oxazolium hydroxide

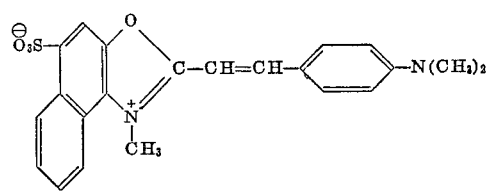

2,3-dimethyl-8-sulfonaphth[1,2-d]oxazolium p-toluenesulfonate (1 mol., 2.25 g.) and p-dimethylaminobenzaldehyde (1 mol. plus 100% excess, 1.5 g.) were mixed in absolute ethyl alcohol (30 ml.), piperidine ten drops added and the mixture heated under reflux for fifteen minutes. The reaction mixture was then chilled, crude dye filtered off, washed with acetone and dried. After two recrystallizations from acetic acid the yield of pure dye was 0.2 g. (7%); melting point above 315° C.

EXAMPLE 3

Anhydro-2-p-hydroxystyryl-1,1-dimethyl-3-(3-sulfobutyl)-1H-benz[e]indolium hydroxide, monosulfonated

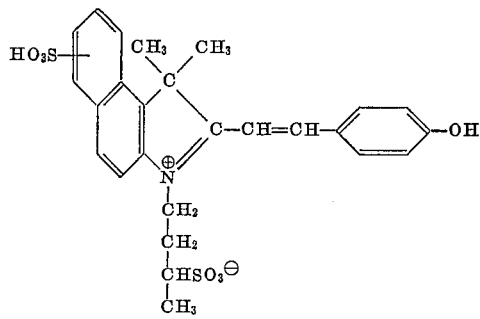

1,1,2 - trimethyl-1H-benz[e]indole-monosulfonated (1 ml., 5.78 g.) and 2,4-butanesultone (sufficient excess to form a mobile mixture) were mixed and heated over a free flame until the viscous mixture turned brownish-black in color. The mixture was then cooled and the anhydro - 3(3 - sulfobutyl) - 1,1,2-trimethyl-1H-benz[e]indolium hydroxide, monosulfonated, precipitated as a grey solid by treating the mixture with an excess of acetone and stirring. At this point the hygroscopic grey solid was filtered off, dissolved in refluxing ethyl alcohol (100 ml.), p-hydroxybenzaldehyde (1 mol. plus 10% excess, 2.6 g.) added and the mixture heated under reflux for twenty minutes. The mixture was then chilled and the crude dye precipitated from solution by turning the mixture into acetone (300 ml.) with stirring. The solid dye was filtered off, washed with acetone and dried. After two recrystallizations from methyl alcohol the yield of pure dye was 7.2 g. (68%); melting point above 310° C.

EXAMPLE 4

Anhydro - 2 - [9 - (1,2,3,5,6,7-hexahydrobenzo[i,j]-quinolizinyl)-vinyl]-1,1-dimethyl-3-(3-sulfobutyl)-1H-benz[e]indolium hydroxide, monosulfonated

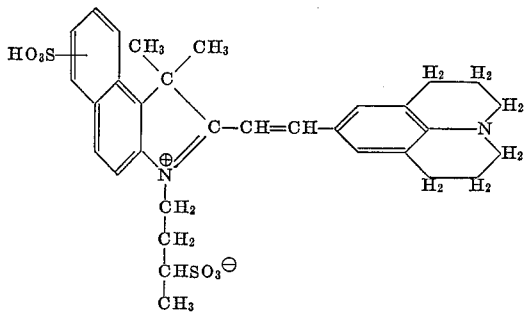

1,1,2 - trimethyl - 1H-benz[e]indole-monosulfonated (1 mol., 5.78 g.) and 2,4-butanesultone (sufficient excess to form a mobile mixture), were mixed and heated over a free flame until the viscous mixture turned brownish-black in color. The mixture was then cooled and the anhydro-3 - (3-sulfobutyl)-1,1,2-trimethyl-1H-benz[e]indolium hydroxide-monosulfonated precipitated as a grey solid by treating the mixture with an excess of acetone with stirring. At this point the hygroscopic grey solid was filtered off, dissolved in refluxing ethyl alcohol (100 ml.), 9-formyljuloidine (1 mol. plus 10% excess, 4.5 g.) added and the mixture heated under reflux for fifteen minutes. The mixture was then chilled, crystalline dye filtered off, washed with acetone and dried. After two recrystallizations from methyl alcohol plus 10% water and acetone the yield of pure dye was 6.6 g. (51%); melting point 262°–263° C.

EXAMPLE 5

Anhydro - 2 - p - dimethylaminostyryl-1,1-dimethyl-3-(3-sulfobutyl) - 1H-benz[e]indolium hydroxide, monosulfonated

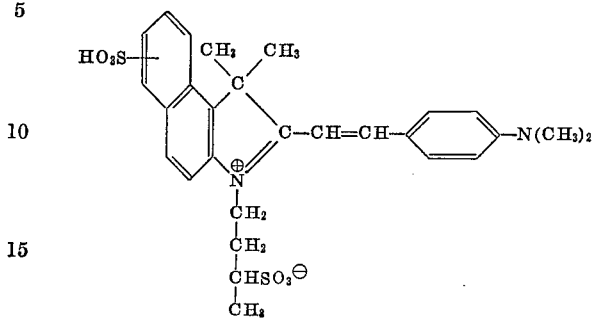

1,1,2 - trimethyl - 1H - benz[e]indole-monosulfonated (1 mol., 5.78) and 2,4-butanesultone (sufficient excess to form a mobile mixture), were mixed and heated over a free flame until the viscous mixture turned brownish-black in color. The mixture was then cooled and the anhydro-3- (3 - sulfobutyl) -1,1,2 - trimethyl - 1H - benz[e]indolium hydroxide, monosulfonated precipitated as a grey solid by treating the mixture with an excess of acetone with stirring. At this point the hygroscopic grey solid was filtered off, dissolved in refluxing ethyl alcohol (200 ml.), p-dimethylaminobenzaldehyde (1 mol. plus 10% excess, 3.3 g.) added and the mixture heated under reflux for fifteen minutes. The mixtures was then chilled, solid dye filtered off, washed with acetone and dried. After two recrystallizations from methyl alcohol plus 5% water the yield of pure dye was 4 g. (35%); melting point above 310° C.

EXAMPLE 6

Anhydro-2-p-dimethylaminostyryl-3-ethyl-6-sulfobenzothiazolium hydroxide

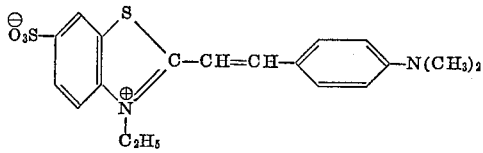

2 - methyl - 6 - sulfobenzothiazole (1.15 g., 1 mol.) and diethyl sulfate (2.3 g., 1 mol. plus 200%) were mixed and alternately heated to boiling and allowed to cool to room temperature until the mixture became homogeneous. After cooling, the betaine was well washed with ether and then dissolved in ethyl alcohol and p-dimethylaminobenzaldehyde (1.49 g., 1 mol. plus 100%) and two drops of piperidine were added. After heating under reflux for ten minutes, the crude dye was collected on a filter, washed with acetone and dried. After two recrystallizations from methyl alcohol, the yield of pure dye was 0.70 g. (36%); melting point >300° C.

The manner of preparing the intermediate bases and quaternary salts are illustrated by the following examples.

EXAMPLE 7

2-methyl-4-p-sulfophenylthiazole

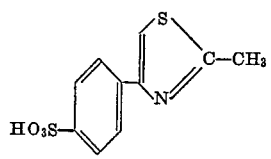

2-methyl-4-phenylthiazole (8.8 g., 1 mol.) and 99% sulfuric acid (45 ml., 16.8 mol.) were heated at 155–167° C. on an oil bath for one hour. The reaction mixture was cooled and slowly added to acetone (500 ml.) with stirring. The initial acetone was decanted and the crude product washed twice with acetone (500 ml.), filtered and dried. The yield of crude product was 10.0 g. (79%); melting point >310° C. A small portion was washed with hot methyl alcohol; melting point >310° C.

EXAMPLE 8

2-methyl-8-sulfonaphth[1,2-d]oxazole

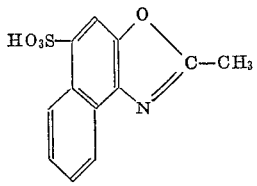

1-amino-2-naphthol-4-sulfonic acid (1 mol. 48 g.) was mixed in pyridine (80 ml.) and dissolved by adding water (30 ml.). At this point the amber solution was warmed gently in a heating mantle and acetic anhydride (360 ml.) added in small portions. Much heat was evolved during the addition causing the mixture to reflux vigorously. After all of the acetic anhydride was added the entire solution was heated under reflux for two hours. The solvents were then removed under reduced pressure leaving a thick syrup which was dissolved in water (500 ml.). The aqueous solution was then made strongly acid to universal indicator paper by adding concentrated sulfuric acid with stirring. At this point the product precipitated out of solution as a white solid. The solid was then filtered off, washed with water and dried. After two recrystallizations from ethyl alcohol the yield of white solid was 35 g. (67%); melting point above 320° C.

EXAMPLE 9

2-methyl-5-sulfobenzoxazole

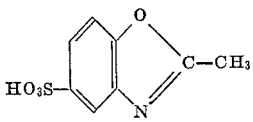

2-amino-1 phenol-4-sulfonic acid (1 mol., 37.8 g.) was partially dissolved in a solution of pyridine (80 ml.) plus water (30 ml.) and dissolved completely by heating the mixture to 80° C. At this point the amber solution was cooled and acetic anhydride (360 ml.) added in small portions. Much heat was evolved during the addition causing the mixture to reflux vigorously. After all of the acetic anhydride was added the entire solution was heated under reflux for four hours. The solvents were then removed under reduced pressure leaving a thick syrup which was cooled and stirred with an excess of ether. At this point the ether was decanted, acetone added with stirring, acetone decanted and the product obtained as tan crystals by stirring ethyl alcohol (300 ml.). The tan solid was then filtered off and dried. After two recrystallizations from ethyl alcohol the yield of light tan solid was 34 g. (80%); melting point 164–165° C.

EXAMPLE 10

1,1,2-trimethyl-1H-benz[e]indole, monosulfonated

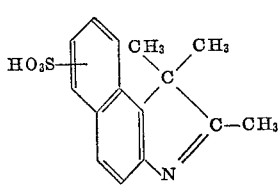

1,1,2-trimethyl-H-benz[e]indole (1 mol., 5 g.) and concentrated sulfuric acid (50 ml.) were mixed and the mixture heated at 180° C. for thirty minutes. The mixture was then cooled, turned into ice (100 g.), neutralized with 40% sodium hydroxide (25 ml.) and the crystalline product filtered off, washed with acetone and dried. After two crystallizations from water the yield of pure product was 5.4 g. (80%); melting point above 310° C.

EXAMPLE 11

2,3-dimethyl-8-sulfonaphth[1,2-d]oxazolium p-toluenesulfonate

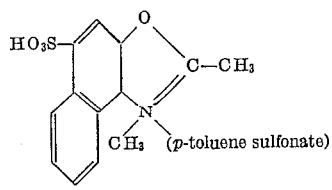

2-methylnaphth[1,2]oxazole-8-sulfonic acid (1 mol., 21 g.) and methyl-p-toluenesulfonate (1 mol. plus 200% excess, 45 g.) were mixed and heated at 150° C. for two days giving a dark colored slurry. The dark slurry was then cooled, stirred with ether, ether decanted, acetone added with stirring and after several minutes the product became a light colored solid. At this point the product was filtered off, washed with acetone and dried. The yield of crude salt was 19 g. (53%); melting point 296–297° C. dec.

EXAMPLE 12

3-ethyl-2-methyl-5-sulfobenzoxazolium, p.t.s.

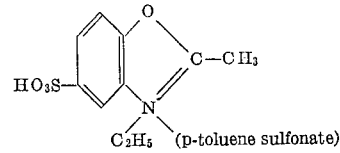

2-methylbenzoxazole-5-sulfonic acid (1 mol., 10.6 g.) and ethyl p-toluenesulfonate (1 mol. plus 100% excess, 20 g.) were mixed and heated at 112° C. for twenty hours giving a dark viscous mass. The salt was obtained as a grey solid by stirring the viscous mass with an excess of acetone. At this point the grey solid was filtered off, washed with acetone and dried. The yield of salt was 6 g. (29%); melting point 287–288° C.

EXAMPLE 13

2-methyl-6-sulfobenzothiazole

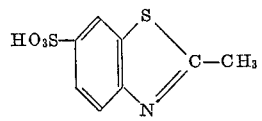

2-methylbenzothiazole (20 g.) was dissolved in 98% sulfuric acid (30 ml.) and 20% oleum (30 ml.) was added. After the addition of ferric chloride (0.1 g.), the mixture was heated at an external flask temperature of 200° C. for one hour. The reaction mixture was then chilled and poured slowly into acetone (2000 ml.) with vigorous stirring. The solid was allowed to settle, the acetone decanted and the solid washed with an additional 2000 ml. of acetone. The white crystalline product was collected on a filter, washed with acetone and dried. After purification by boiling with methanol (100 ml.), chilling and collecting on a filter, the yield of product was 22 g. (72%); melting point >300° C.

EXAMPLE 14

2-methyl-6-sulfobenzoxazole

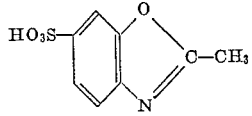

2-methylbenzoxazole (20 g.) was dissolved in 98% sulfuric acid (30 ml.) and 20% oleum (30 ml.) was added. After the addition of ferric chloride (0.1 g.), the mixture was heated at an external flask temperature of 200° C. for one hour. The reaction mixture was then chilled and poured slowly into acetone (2000 ml.) with vigorous stirring. The mixture was stirred until the product became granular and crystalline. The acetone was then decanted and the residue stirred with an additional 2000 ml. of acetone. The product was then collected on a filter, washed with acetone and dried. After purification by boiling with methanol, chilling and collecting on a filter, the yield of product was 19 g. (59%); melting point 283–285° C. with dec.

The dyes of our invention are used to advantage in hydrophilic colloid layers of photographic elements as light-screening layers or antihalation layers. The dye containing layers of our invention are prepared by coating on the photographic element or on its support, by methods well known in the art, a water solution of the dye and a hydrophilic colloid binder. It is advantageous to use a coating aid such as saponin, a basic mordant, and a hardener to the coating composition. The proportions of dye, binder, and other addenda where used may be varied over wide ranges and will depend upon the specific requirements of the photographic element being produced. The method used to determine the optimum composition is well known in the art and need not be described here.

The light-sensitive layer or layers and the light-screening layer or layers of the photographic element may be coated on any suitable support material used in photography such as cellulose nitrate, cellulose acetate, synthetic resin, paper, etc.

Hydrophilic colloidal materials used as binders include gelatin, collodion, gum arabic, cellulose ester derivatives such as alkyl esters of carboxylated cellulose, hydroxy ethyl cellulose, carboxy methyl hydroxy ethyl cellulose, synthetic resins, such as the amphoteric copolymers described by Clavier et al. in U.S. Patent 2,949,442, issued Aug. 16, 1960, polyvinyl alcohol, and others well known in the art. The above-mentioned amphoteric copolymers are made by polymerizing the monomer having the formula:

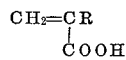

wherein R represents an atom of hydrogen or a methyl group, and a salt of a compound having the general formula:

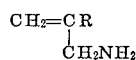

wherein R has the above-mentioned meaning, such as an alkylamine salt. These monomers can further be polymerized with a third unsaturated monomer in an amount of 0 to 20 percent of the total monomer used, such as an ethylene monomer that is copolymerizable with the two principal monomers. The third monomer may contain neither a basic group now an acid group and may, for example, be vinyl acetate, vinyl chloride, acrylonitrile, methacrylonitrile, styrene, acrylates, methacrylates, acrylamide, methacrylamide, etc. Examples of these polymeric gelatin substitutes are copolymers of allylamine and methacrylic acid; copolymers of allylamine, acrylic acid and acrylamide; hydrolyzed copolymers of allylamine, methacrylic acid and vinyl acetate; the copolymers of allylamine, acrylic acid and styrene, the copolymers of allylamine, methacrylic acid and acrylonitrile; etc.

Our dyes are generally added to the water-permeable colloidal binder in water solution. In some instances, it may be advantageous to form an alkali metal salt of the dye by dissolving the dye in a dilute aqueous alkali metal carbonate solution, for example. Usually a coating aid, such as saponin, is added to the dyed colloidal suspension before coating it as a layer on the photographic element. The dyes are advantageously mordanted with a suitable basic mordant added to the colloidal suspension before coating.

Basic mordants that may be used include the basic mordants described by Minsk in U.S. 2,882,156, issued Apr. 14, 1959, prepared by condensing a polyvinyl-oxo-compound such as a polyacrolein, a poly-γ-methylacrolein, a polyvinyl alkyl ketone, such as polyvinyl methyl ketone, polyvinyl ethyl ketone, polyvinyl propyl ketone, polyvinyl butyl ketone, etc., or certain copolymers containing acrolein, methacrolein, or said vinyl alkyl ketone components, for example, 1 to 1 molar ratio copolymers of these components with styrene or alkyl methacrylates wherein the alkyl group contains from 1 to 4 carbon atoms, such as methyl, ethyl, propyl, or butyl methacrylates in the proportions from about .25 to 5 parts by weight of the said polymeric oxo-compound with one part by weight of an aminoguanidine compound such as aminoguanidine bicarbonate, aminoguanidine acetate, aminoguanidine butyrate, etc.

Although it is possible to use other basic mordants known in the art, the preferred mordants are those described above. Hardening materials that may be used to advantage include such hardening agents as formaldehyde; a halogen-substituted aliphatic acid such as mucobromic acid as described in White, U.S. Patent 2,080,019, issued May 11, 1937; a compound having a plurality of acid anhydride groups such as 7,8-diphenylbicyclo-(2,2,2)-7-octene-2,3,5,6-tetra-carboxylic dianhydride or a dicarboxylic or a disulfonic acid chloride such as terephthaloyl chloride or naphthalene-1,5-disulfonyl chloride as described in Allen and Carroll, U.S. Patents 2,725,294 and 2,725,295, both issued Nov. 29, 1955; a cyclic 1,2-diketone such as a cyclopentane -1,2-dione as described in Allen and Byers, U.S. Patent 2,725,304, issued Nov. 29, 1955; a biester of methanesulfonic acid such as 1,2-di(methanesulfonoxy)ethane as described in Allen and Laakso, U.S. Patent 2,726,162, issued Dec. 6, 1955; 1,3-dihydroxymethylbenzimidazol-2-one as described in July, Knott and Pollak, U.S. Patent 2,732,316, issued Jan. 24, 1956; a dialdehyde or a sodium bisulfite derivative thereof, the aldehyde groups of which are separated by 2 to 3 carbon atoms, such as β-methyl glutaraldehyde bis-sodium bisulfite as described in Allen and Burness, Canadian Patent No. 588,451, granted Dec. 8, 1959; a bis-aziridine carboxamide such as trimethylene bis(1-aziridine carboxamide) as described in Allen and Webster, U.S. Patent 2,950,197, issued Aug. 23, 1960; or 2,3-dihydroxydioxane as described in Jeffreys, U.S. Patent 2,870,013, issued Jan. 20, 1959.

The photographic elements utilizing our light-screening layers have light-sensitive emulsion layers containing silver chloride, silver bromide, silver chlorobromide, silver iodide, silver bromoiodide, silver chlorobromoiodide, etc., as the lightsensitive material. Any light-sensitive silver halide emulsion layers may be used in these photographic elements. The silver halide emulsion may be sensitized by any of the sensitizers commonly used to produce the desired sensitometric characteristics.

The followng table further illustrates our invention by describing the spectral absorption characteristics of representative dyes.

| Dye No.: | λmax. in mμ |
|---|---|
| 1 | 488 |
| 2 | 505 |
| 3 | 463 |
| 4 | 605 |
| 5 | 571 |
| 6 | 533 |

In the preparation of our dyes that contain a sulfoalkyl group on the heterocyclic nitrogen atom, the sulfoalkyl group can either be added to the base of the dye intermediate before the dye forming condensation reaction as described in the preceding examples or alternatively the sulfoalkyl group can be added by reacting the dye base with the appropriate alkane sultone. For example, anhydro-4-p-methoxystyryl-1-(4-sulfobutyl)quinolinium hydroxide is made to advantage by condensing equimolar amounts of anisaldehyde and lepidine by heating with concentrated hydrochloric acid to 200° C. and allowing the water to distill off. The residue is cooled, the solid collected on a filter and washed with acetone. The solid is then suspended in water and made basic with ammonium hydroxide. The oil layer is then extracted from the water with chloroform and the chloroform extract dried over calcium chloride. The chloroform is then removed and the residue heated with an equimolar amount of 1,4-butanesultone at 135° C. for two hours. The dye product is ground under acetone and dried in a vacuum desiccator. This dye can then be nuclear sulfonated by suitable means, such as, treating with four or five times its weight of 20% oleum to produce one of our dyes.

Figure 2:
Figure 3:
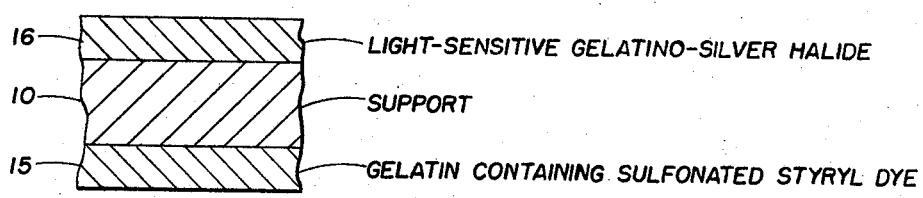

The accompanying drawings FIGS. 1, 2 and 3 showing cross-sectional views of our photographic elements still further illustrate our invention.

FIG. 1 shows support 10 coated in succession with light-sensitive gelatino-silver halide emulsion layer 11 and gelatin layer 12 containing one of our sulfonated styryl dyes.

FIG. 2 shows support 10 coated in succession with gelatin layer 13 containing one of our sulfonated styryl dyes, and light-sensitive gelatino-silver halide emulsion layer 14.

FIG. 3 shows support 10 coated on one side by light-sensitive gelatino-silver halide emulsion layer 16 and coated on the other side of said support a gelatin layer containing one of our sulfonated styryl dyes.

Our filter layers are also used to advantage between the light-sensitive layers of a multilayer photographic element. For example, the yellow-colored dyes of our invention are used to advantage in a layer of a multicolor, multilayer photographic element between the top blue-sensitive layer and the green-sensitive layer coated under the blue-sensitive layer.

The invention has been described in detail with particular reference to preferred embodiments thereof but it will be understood that variations and modifications can be effected within the spirit and scope of the invention as described hereinabove and as defined in the appended claims.

We claim:

1. A light-sensitive photographic element comprising a support having coated thereon a silver halide emulsion layer and at least one layer containing a dye selected from the group consisting of dyes having the formulas:

(1)

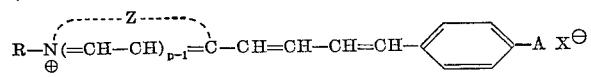

and (2)

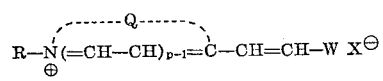

wherein $p$ represents an integer from 1 to 2; R represents an alkyl group; Z represents the non-metallic atoms required to complete a heterocyclic nucleus containing a sulfo group attached directly to a nuclear carbon atom, said heterocyclic nucleus being selected from the group consisting of a benzothiazole nucleus, a thianaphtheno-7',6',4,5-thiazole nucleus, a benzoxazole nucleus, a naphthoxazole nucleus, a benzoselenazole nucleus, a naphthoselenazole nucleus, a 2-quinoline nucleus, a 4-quinoline nucleus, a 1-isoquinoline nucleus, a 3-isoquinoline nucleus, and a naphthimidazole nucleus; Q represents the non-metallic atoms required to complete a heterocyclic nucleus containing a sulfo group attached directly to a nuclear carbon atom, said heterocyclic nucleus being selected from the group consisting of a benzothiazole nucleus, a thianaphtheno-7'-6',4,5-thiazole nucleus, a benzoxazole nucleus, a naphthoxazole nucleus, a benzoselenazole nucleus, a naphthoselenazole nucleus, a 2-quinoline nucleus, a 4-quinoline nucleus, a 1-isoquinoline nucleus, a 3-isoquinoline nucleus, a naphthimidazole nucleus, and a 3,3-dialkylindolenine nucleus; A represents a member selected from the group consisting of the hydroxyl group, an alkoxy group and the $-NR_1R_2$ group wherein $R_1$ and $R_2$ each represents an alkyl group of from 1–12 carbon atoms; W represents a group selected from the class consisting of a

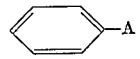

group and a

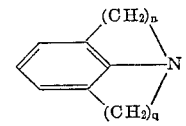

group; $n$ represents an integer of from 2 to 3; $q$ represents an integer of from 2 to 3; and $X^\ominus$ represents an acid anion.

2. A light-sensitive photographic element in accordance with claim 1 wherein a dye selected from the dyes having the formula numbered 1 is employed.

3. A light-sensitive photographic element in accordance with claim 1 wherein a dye selected from the dyes having the formula numbered 2 is employed.

4. A light-sensitive photographic element comprising a support having coated thereon a silver halide emulsion layer and at least one layer containing the dye anhydro-2-p-dimethylaminostyryl-1-methyl-5 - sulfonaphth[1,2 - d] oxazolium hydroxide.

5. A light-sensitive photographic element containing a support having thereon a silver halide emulsion layer and at least one layer containing the dye anhydro-2-p-hydroxystyryl-1,1-dimethyl-3-(3-sulfobutyl)-1H - benz[e]indolium hydroxide, and wherein one of the nuclear carbon atoms of the heterocyclic nucleus present in said dye contains a single sulfo group attached directly thereto.

6. A light-sensitive photographic element comprising a support having coated thereon a silver halide emulsion layer and at least one layer containing the dye anhydro-2-[9-(1,2,3,5,6,7-hexahydrobenzene[i,j]quinolizinyl)vinyl]-1,1-dimethyl-3-(3-sulfobutyl)-1H - benz[e]indolium hydroxide, and wherein one of the nuclear carbon atoms of the 1H-benz[e]indolium heterocyclic nucleus present in said dye contains a single sulfo group attached directly thereto.

7. A light-sensitive photographic element comprising a support having coated thereon a silver halide emulsion layer and at least one layer containing the dye anhydro-2-p-dimethylaminostyryl-3-ethyl-6-sulfobenzothiazolium hydroxide.

8. A light-sensitive photographic element comprising a support having coated thereon a silver halide emulsion layer and at least one layer containing the dye anhydro-2-p-dimethylaminostyryl - 1,1 - dimethyl-3-(3-sulfobutyl)-1H-benz[e]indolium hydroxide, and wherein one of the nuclear carbon atoms of the heterocyclic nucleus present in said dye contains a single sulfo group attached directly thereto.

References Cited

UNITED STATES PATENTS

| 1,845,404 | 2/1932 | Durr et al. | 96—84 |
| 2,255,077 | 9/1941 | Middleton | 96—84 XR |
| 3,148,187 | 9/1964 | Heseltine | 96—84 XR |

FOREIGN PATENTS

| 448,508 | 6/1936 | Great Britain. |

NORMAN G. TORCHIN, *Primary Examiner.*

R. H. SMITH, *Assistant Examiner.*

U.S. Cl. X.R.

260—240.9